United States Patent [19]
Kalsi

[11] Patent Number: 6,066,906
[45] Date of Patent: May 23, 2000

[54] ROTATING MACHINE HAVING SUPERCONDUCTING WINDINGS

[75] Inventor: Swarn S. Kalsi, Shrewsbury, Mass.

[73] Assignee: American Superconductor Corporation, Westborough, Mass.

[21] Appl. No.: 09/251,311

[22] Filed: Feb. 17, 1999

[51] Int. Cl.[7] .............................. H02K 19/12; H02K 1/00; H02K 1/22
[52] U.S. Cl. .......................... 310/179; 310/263; 310/266; 310/112; 310/165
[58] Field of Search ..................... 310/263, 266, 310/112, 165, 10, 179

[56] References Cited

U.S. PATENT DOCUMENTS 5,495,131 2/1996 Goldie et al. .............................. 310/12
5,777,420 7/1998 Gamble et al. ........................ 310/261

Primary Examiner—Nestor Ramirez
Assistant Examiner—Guillermo Perez
Attorney, Agent, or Firm—Fish & Richardson

[57] ABSTRACT

A superconducting rotating machine includes a direct current field excitation source and an alternating current armature winding mounted on a stationary support member, at least one of which includes a superconducting material, a core member formed of a magnetic permeable material and rotatable around the static support member, and a refrigerator unit which cryogenically cools at least one of the field excitation source and the armature winding. The superconducting rotating machine may have a construction for providing polyphase (e.g., three-phase) power.

25 Claims, 6 Drawing Sheets

ROTATING MACHINE HAVING SUPERCONDUCTING WINDINGS

BACKGROUND OF THE INVENTION

The invention relates to superconducting rotating machines (e.g., a superconducting electric generator or motor) and their constructions.

The worldwide demand for additional electrical generation is ever increasing. To meet these demands, larger and more efficient electrical generators are being developed. Electric generators convert rotational mechanical input energy (e.g., that from a steam or gas turbine) into electricity by rotating a rotor field within stationary armature conductors. In conventional generators, the generator field is produced with copper windings or permanent magnets.

The overall efficiency of an electrical generator is affected by the losses in the rotor windings and in the armature windings. By using superconducting wire for the field windings, these losses become almost negligible. Moreover, the overall volume of an electrical generator using high temperature superconductor (HTS) generator can be as much as ⅓ the volume of its conventional equivalent.

Such superconducting generators are also finding application in power plants where expansion is difficult (e.g., shipboard or locomotive power). Smaller, lighter HTS generators use an "air core" design, eliminating much of the structural and magnetic steel of a conventional equivalent. Construction, shipping, and installation are all simplified and less costly.

SUMMARY OF THE INVENTION

The invention features a superconducting rotating machine which produces increased electric power with significantly lower losses while being smaller and lighter than conventional equivalent electric rotating machines.

In a general aspect of the invention, the superconducting rotating machine includes a direct current field excitation source and an alternating current armature winding mounted on a static support member, at least one of the excitation winding and armature including a superconducting material, a core member formed of a magnetic permeable material and rotatable around the static support member, and a refrigerator unit which cryogenically cools at least one of the excitation winding and armature.

In the above arrangement, the field excitation source and armature winding are mounted statically to a support member and the core is rotated about the field excitation source and armature winding. This arrangement has numerous advantages. Specifically, because the field excitation source and armature winding are not mounted on a rotating, or otherwise moving member, difficulties associated with cooling moving parts are eliminated. Thus, either or both of the field excitation source and armature winding can be more easily cooled, for example, with a cryocooler. Because cooling is easier, either or both of the field excitation source and armature winding, can be formed of superconducting material. This advantage is important because a significant amount of the total electrical losses in an electric rotating machine are associated with the field excitation source and armature winding. Further, because the electrical losses, weight, and volume of the rotating machine are significantly reduced, the overall efficiency and reliability of the machine is increased. Moreover, installation, as well as retrofitting, of this construction is simplified and less costly.

Embodiments of this aspect of the invention may include one or more of the following features.

For example, in one embodiment, the field excitation source is a non-superconducting permanent magnet, with the armature winding including the superconducting material. Alternatively, the field excitation source is in the form of a coil (superconducting or non-superconducting).

The superconducting material is a high temperature superconductor (HTS) and may be in the form of a tape having a thickness and a width greater than the thickness. In embodiments utilizing HTS tape, the field excitation source is a pancake coil, and preferably a double pancake coil. The double pancake coil is preferably a saddle-shaped racetrack coil. Because HTS materials are typically ceramic-based (e.g., BSCCO), such materials are intrinsically less flexible. The saddle-shaped racetrack configuration is well-suited for providing pancake coils with a shape which conforms to rounded support structures.

The superconducting rotating machine may include a plurality of field excitation sources, circumferentially spaced from each other and mounted on the static support member. In preferred embodiments, adjacent ones of the excitation sources have polarities of opposite sense. Thus, when the core member rotates past the excitation sources, the alternating polarity of the magnetic flux causes an AC voltage to be generated.

The core member includes salient members extending in a direction substantially parallel to the longitudinal axis. The salient members, in essence, are extended portions of the core member closely spaced from the excitation winding and armature. First and second groups of salient members are spaced from the longitudinal axis of the core member by first and second radial distances, respectively, with the second radial distance being greater than the first radial distance. This arrangement provides a pair of salient poles between which armature and excitation winding pass, thereby ensuring a good magnetic flux path. The core member is in the form of a radially-stacked lamination of the magnetic permeable material to reduce lossy eddy currents.

In another aspect of the invention, a polyphase rotating machine (e.g., three-phase machine) includes a plurality of direct current excitation source groups and a plurality of alternating current armature windings. Each armature winding associated with and magnetically coupled to a corresponding one of the plurality of excitation source groups. Each excitation source group is mounted on the static support member and has at least one excitation source including a superconducting material. Each excitation source from a first one of the excitation source groups is radially spaced from an excitation source of a second one of the excitation source groups. The polyphase rotating machine also includes a core member formed of a magnetic permeable material and rotatable about a longitudinal axis and around the static support member, as well as a refrigerator unit which cryogenically cools the excitation windings. The core member is disposed adjacent to the excitation windings of the phase winding groups and armature windings.

Embodiments of the polyphase rotating machine may include one or more of the features described above as well as the following additional feature. The core member includes salient member groups, each group extending in a direction substantially parallel to the longitudinal axis and radially spaced from another of the groups of salient members, each of the phase winding groups positioned between the groups of salient members. This arrangement provides salient members on either side of each excitation source and armature winding.

Other advantages and features of the invention will become apparent from the following description and claims.

DETAILED DESCRIPTION

Figure 1:
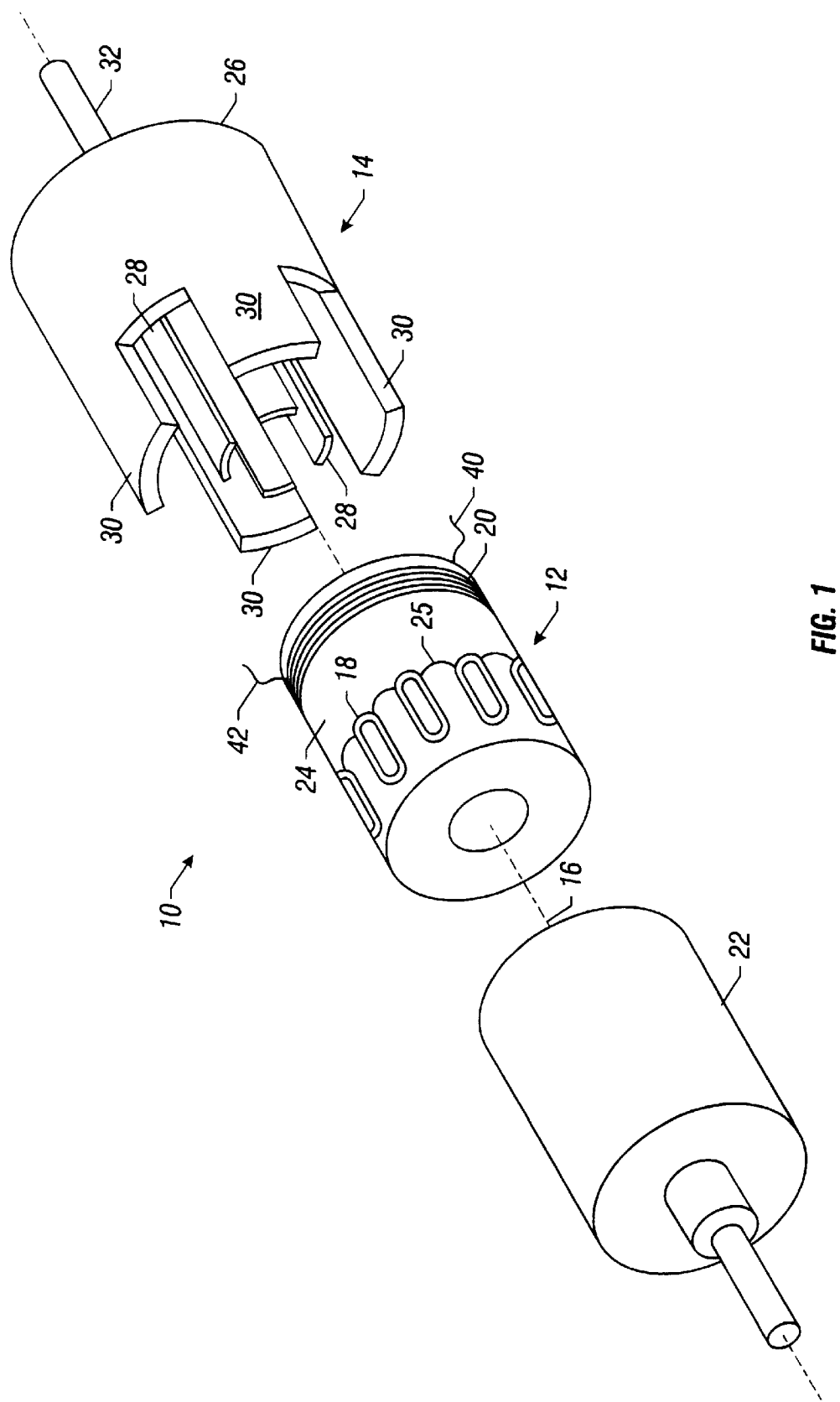
FIG. 1 is an exploded, isometric diagrammatic view of a superconducting rotating machine in accordance with the invention.
Figure 2:
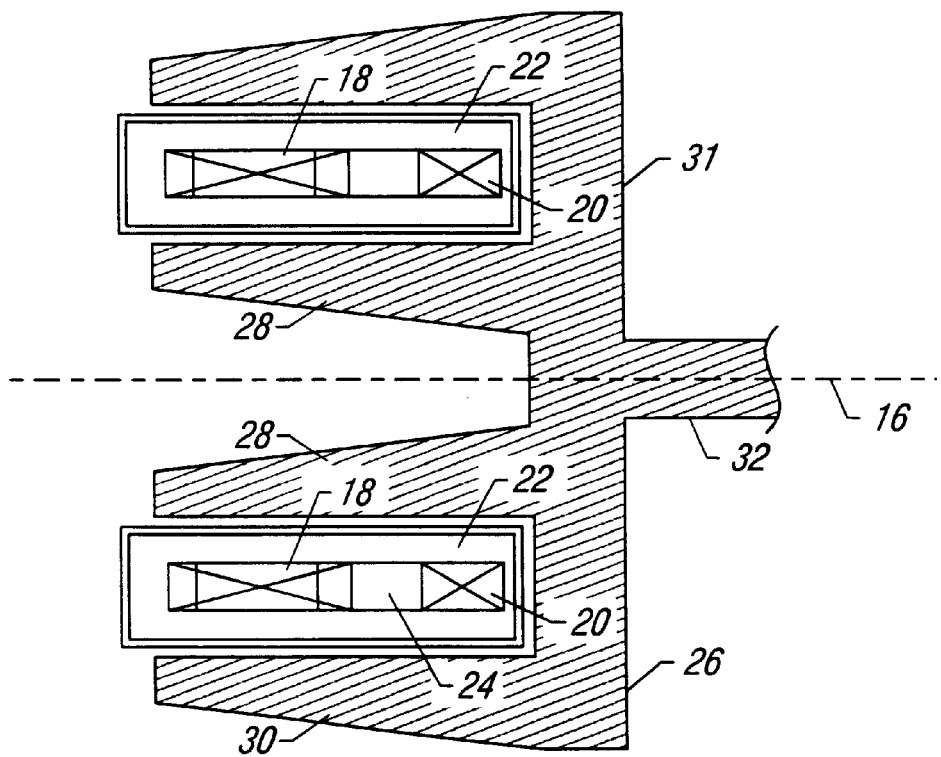
FIG. 2 is a cross-sectional side view of the superconducting rotating machine of FIG. 1.

Referring to FIGS. 1 and 2, a superconducting rotating machine 10 includes a stator assembly 12 and a rotor assembly 14 positioned along a rotational axis 16 of the machine. As will be discussed in greater detail below, stator assembly 12 includes superconducting field excitation windings 18 and a superconducting armature winding 20, both of which are enclosed within a cryocooled refrigeration unit, such as a cryostat 22. Cryostat 22 is thermally coupled to a cryocooler 134 (FIG. 5) to maintain the field excitation windings 18 and armature winding 20 at cryogenic temperatures (e.g., less than 120° K.). In operation, rotor assembly 14 revolves around statically-mounted windings 18, 20 of stator assembly 12.

Stator assembly 12 includes a cylindrical support tube 24, upon which superconducting excitation field windings 20 are mounted. The excitation field windings are equally spaced around the periphery of tube 24. Excitation field windings 20 are connected with superconducting wire 25 in a manner to produce alternating north and south poles. In this embodiment, eight saddle-shaped racetrack windings are excited with a direct current (DC). Superconducting armature 20 is in the form of a circular coil, wound around the periphery of tube 24 and is magnetically coupled to excitation windings 18 through iron core 26. Armature 20 carries a single-phase AC signal.

Rotor assembly 14 includes a core 26 formed of a high permeability material, such as iron. Because iron is a high permeability, high saturation flux density material, it acts, in essence, as a magnetic short circuit for flux generated by excitation windings 18 and armature winding 20. The individual laminations are stacked in the radial direction and are insulated from each other and bonded together, for example, by mill scale, lacquer, or japanning, to minimize the flow of eddy currents in the core. In alternative embodiments, amorphous metal cores, which do not have a preferential direction for magnetic flux flow may be used, at the expense of a generally slightly lower permeability characteristic.

Core 26 includes an inner group of salient arms 28 and an outer group of salient arms 30, both of which extend coaxially along the length of assembly 14 and are connected to a common yoke 31 (FIG. 2). As shown in FIG. 2, each of the outer and inner groups includes four salient arms, radially spaced from each other by a distance sufficient for allowing support tube 24 with excitation windings 18, armature winding 20 and cryostat 22 to pass between associated pairs of the salient arms of the inner and outer groups. The salient arms, in essence, act as high permeability extensions of yoke 31, spaced by a small air gap from extension windings 18 and armature 20. The salient arms, therefore, provide a low reluctance path for magnetic flux generated by windings 18 and armature 20. A shaft 32, attached to core 26 and extending along axis 16, is used to provide a mechanical coupling to, for example, a drive assembly (not shown).

Figure 3:
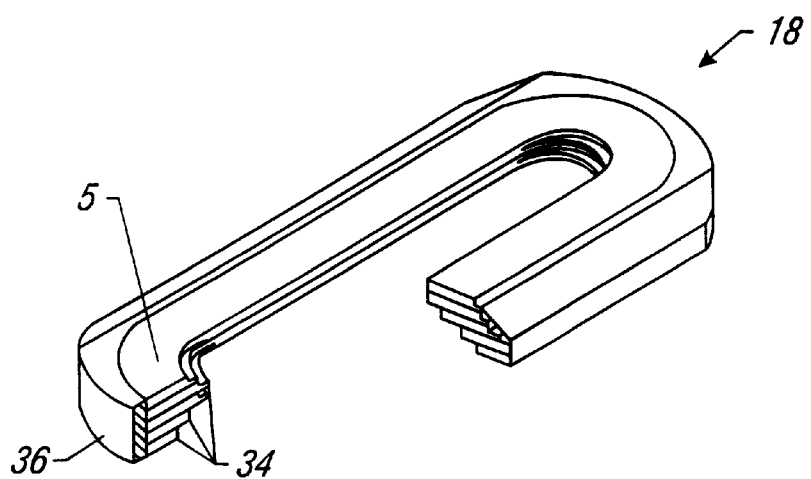
FIG. 3 is an isometric, partially cut-away view of a racetrack superconducting winding for use with the superconducting rotating machine of FIG. 1.

Referring to FIG. 3, each excitation coil 18 includes racetrack double "pancake" coils 34 (here, five in number) wound positioned within a coil support shell 36. Each double pancake coil has co-wound conductors, in the form of superconducting tape, wound in parallel which are then stacked coaxially on top of each other. As shown here, one of more of the double pancake coils 34 may include a pancake coil having a diameter smaller than its associated pancake coil of the double pancake, the two coils of a pair being wound from the same continuous length of superconducting tape. A technique for providing double pancake coils in this manner is described U.S. Pat. No. 5,581,220, which is incorporated herein by reference. In certain applications, the double pancake coils may be wound with a variable profile with the approach described in U.S. Pat. No. 5,581,220, which is incorporated herein by reference.

Both excitation windings 18 and armature windings are wound with superconducting tape, formed of a high temperature superconductor (HTS), such as those made from ceramic or metallic oxides. HTS tape is typically anisotropic, meaning that they generally conduct better, relative to the crystalline structure, in one direction than another. Anisotropic high temperature superconductors include, but are not limited to, the family of Cu—O—based ceramic superconductors, such as members of the rare-earth-copper-oxide family (YBCO), the thallium-barium-calcium-copper-oxide family (TBCCO), the mercury-barium-calcium-copper-oxide family (HgBCCO), and the bismuth strontium calcium copper oxide family (BSCCO). These compounds may be doped with stoichiometric amounts of lead or other materials to improve properties (e.g., $(Bi,Pb)_2Sr_2Ca_2Cu_3O_{10}$). Superconductor tape has a relatively high aspect ratio (i.e., width greater than the thickness) and is fabricated as a multi-filament composite superconductor including individual superconducting filaments which extend substantially the length of the multi-filament composite conductor and are surrounded by a matrix-forming material (e.g., silver). The ratio of superconducting material to the total amount of material (i.e., the matrix-forming material and superconducting material) is known as the "fill factor" and is generally less than 50%. Although the matrix forming material conducts electricity, it is not superconducting. Together, the superconducting filaments and the matrix-forming material form a composite multi-filament high temperature superconducting conductor.

Figure 4:
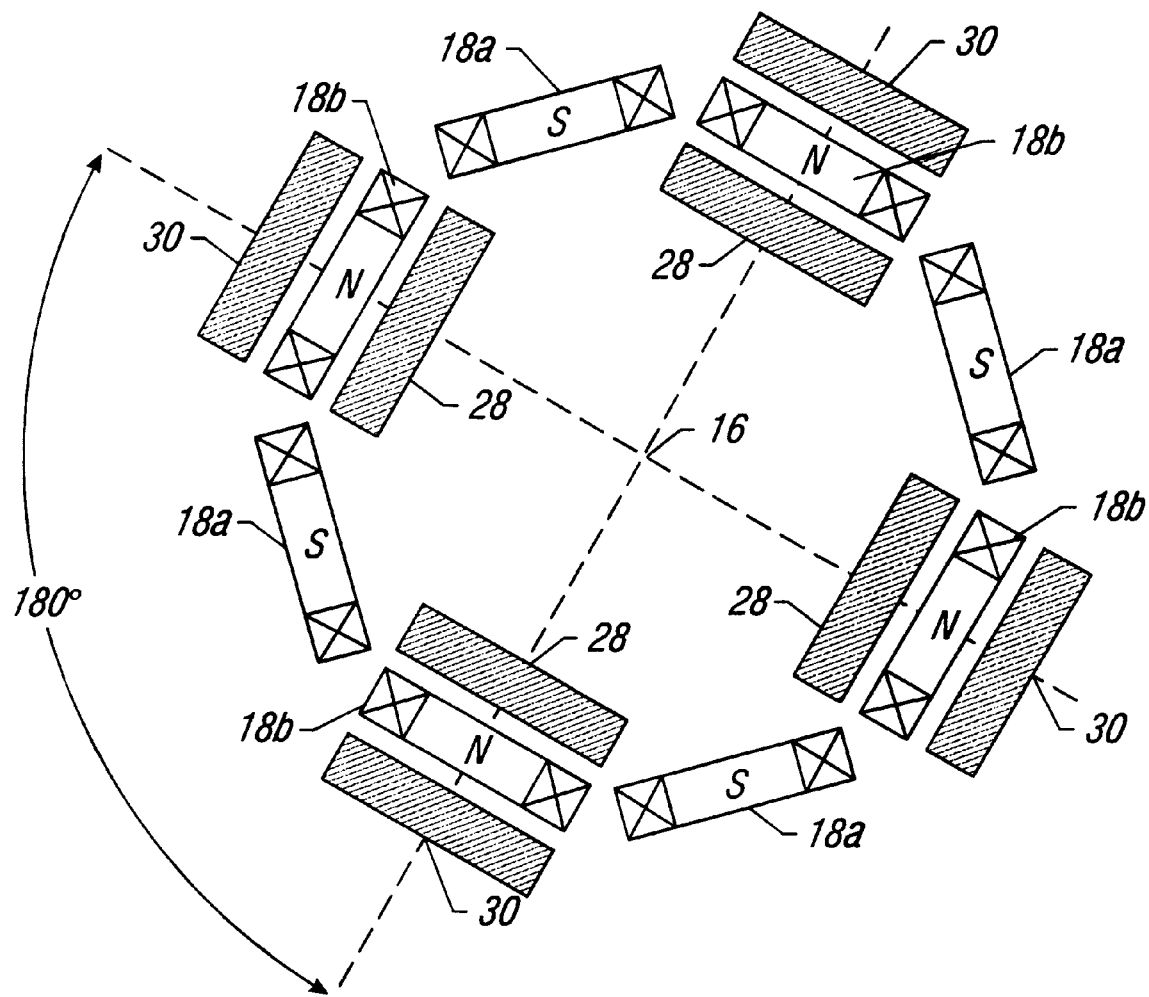
FIG. 4 is a cross-sectional end view of the superconducting rotating machine of FIG. 1.

Referring to FIG. 4, excitation coils 18 are arranged on support tube 24 so that adjacent windings have opposite polar sense. In other words, windings 18 are wound and positioned such that, in operation, they produce alternate north and south magnetic poles. When an excitation winding 18 having a magnetic "north" polarity passes between a corresponding pair of inner and outer salient poles 28, 30, the peak flux is magnetically coupled to core 26. On the other hand, when an adjacent excitation winding 18 having a magnetic "south" polarity passes between the same pair of inner and outer salient poles 28, 30, peak magnetic flux of the opposite sense is coupled to core 26. AC flux is produced in the rotating core 26 as excitation windings 18 sweep by salient poles 28, 30, and current is generated in armature winding 20 and is delivered to a load connected to terminals 40, 42.

Because the majority of electric power produced in the United States is by three-phase generators, the concept of the invention is particularly advantageous when applied to polyphase systems.

Figure 5:
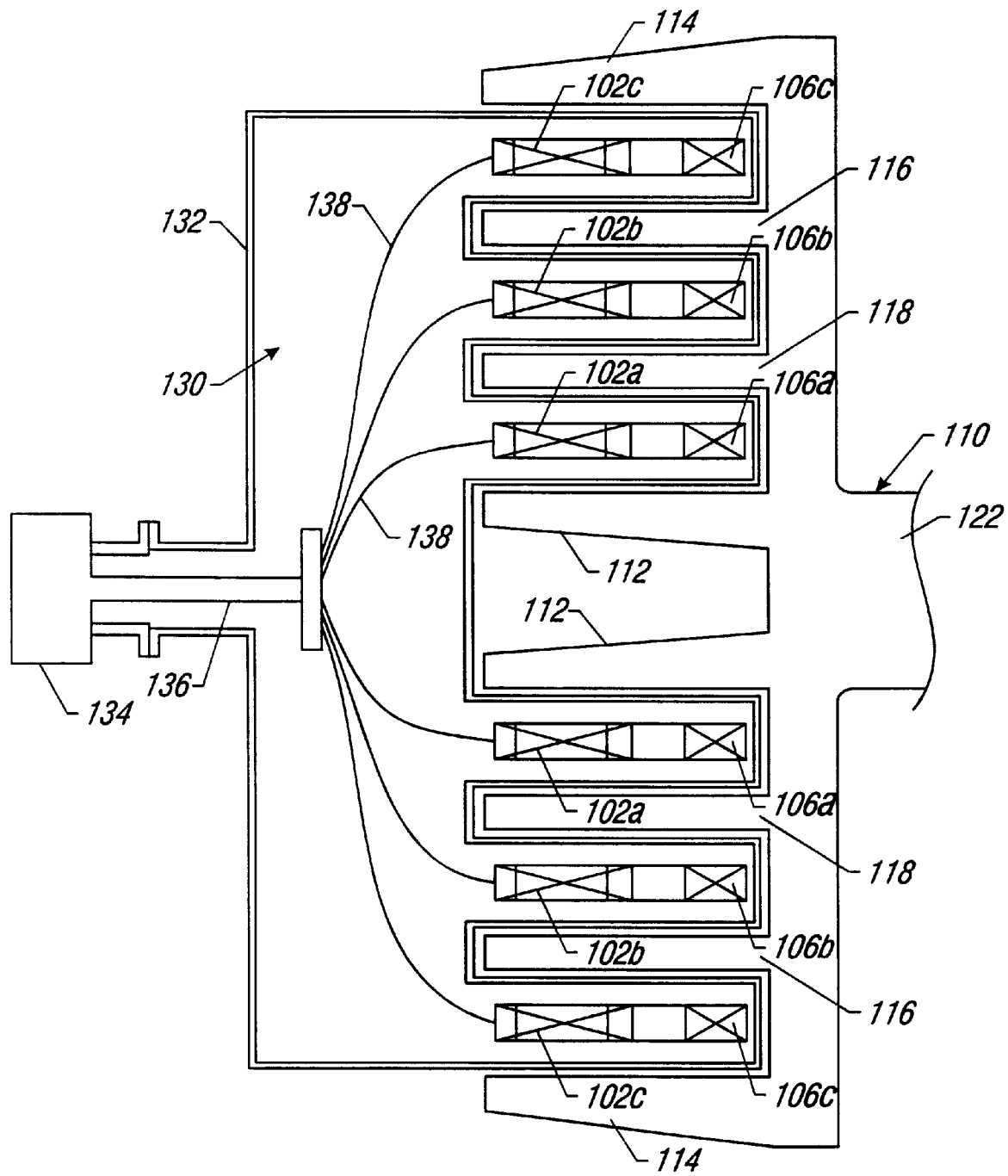
FIG. 5 is a cross-sectional side view of a polyphase embodiment of a superconducting rotating machine.
Figure 6:
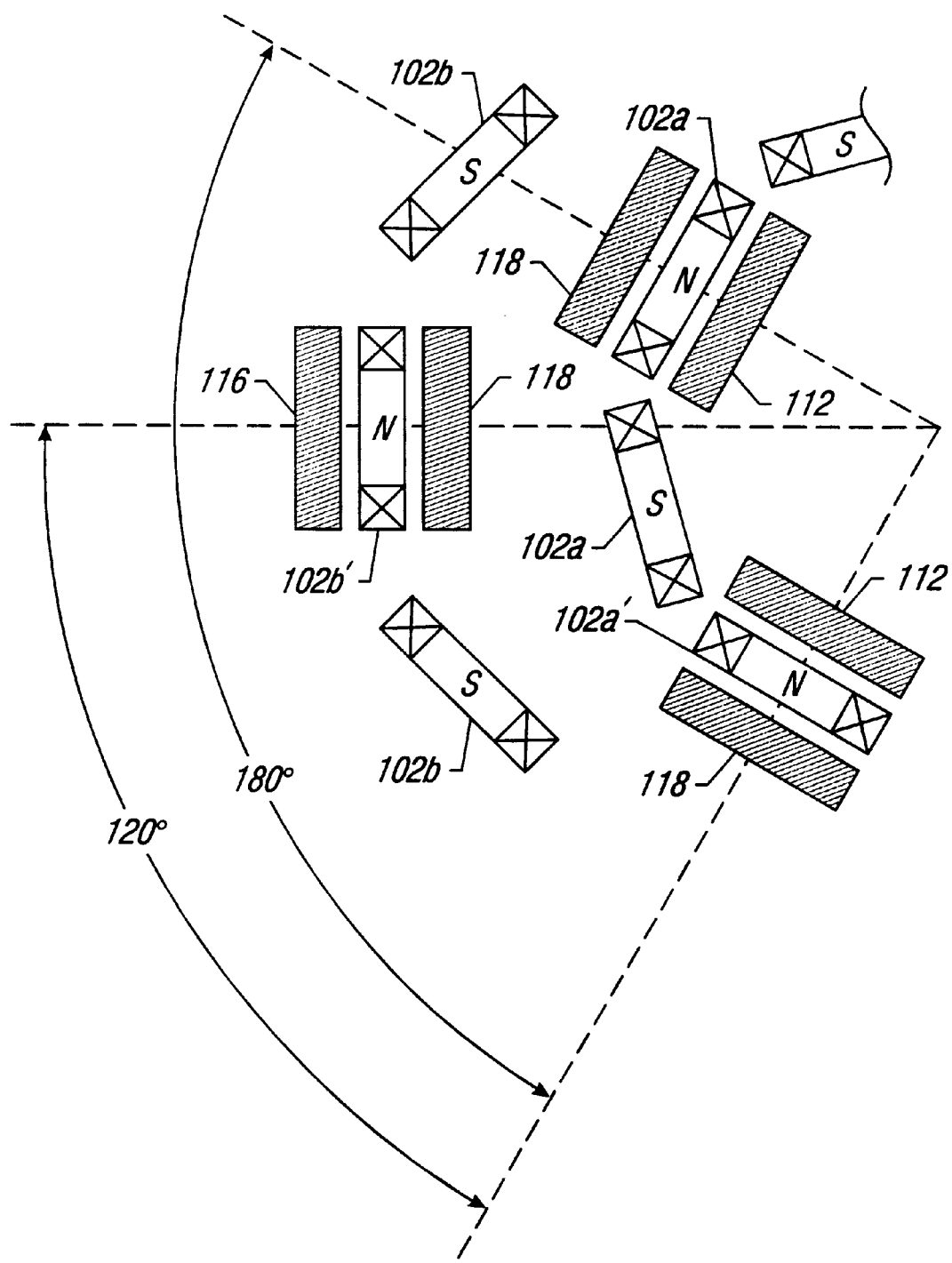
FIG. 6 is a diagrammatic cross-sectional schematic end view of a portion of the polyphase superconducting rotating machine of FIG. 5.

Referring to FIGS. 5 and 6, to provide a three-phase superconducting rotating machine 100, for example, three groups of DC field excitation windings 102a, 102b, 102c are mounted together on the same cylindrical support tube, but spaced from each other in both the radial and circumferential directions. As shown in FIG. 6, in particular, each excitation winding of one group is spaced from a corresponding excitation winding of an adjacent group of an electrical angle of by 120°.

Positioned on support tube 104, as well, are three AC armature windings 106a, 106b, 106c, each of which corresponds to one of the three groups of DC excitation windings. DC filed excitation windings 102a, 102b, 102c, and AC armature windings 106a, 106b, 106c are positioned within an internal volume 130 of a cryostat 132. A cryocooler 134 is connected to cryostat 132 and includes a cold finger element 136 thermally coupled to the field excitation windings and the armature windings, via conductors 138.

For example, a field excitation winding 102a' of group 102a has a north polarity and is electrically spaced from a corresponding field excitation winding 102b' of group 102b which also has a north polarity.

Three-phase superconducting rotating machine 100 includes a rotating core assembly 110 having an inner group of salient arms 112, an outer group of salient arms 114, and a pair of intermediate groups of salient arms 116, 118, all extending from an iron yoke 120 having a shaft 122.

Figure 7:
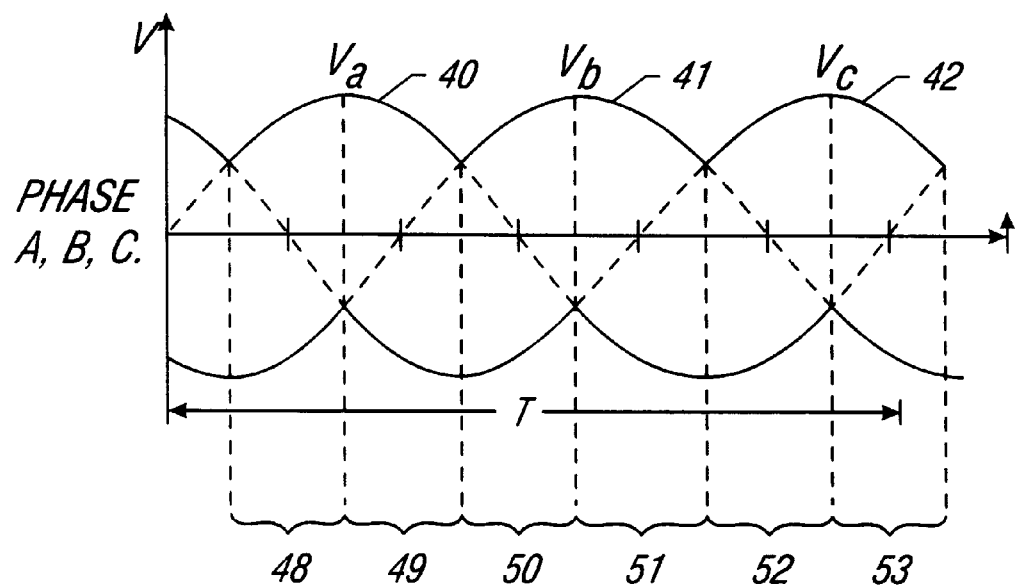
FIG. 7 illustrates the output voltage waveforms for the three different phases of the polyphase superconducting rotating machine of FIG. 5.

Referring to FIG. 7, the operation of the 3-phase machine will now be explained. With reference to FIG. 5, a phase A voltage 140 is generated when, for example, winding 102a passes by salient poles 112, 118 of core 110. Because excitation winding 102b is physically displaced by a 120° electrical angle (60° physical angle for a 4-pole machine) and because salient arms 116 and 118 are similarly displaced by 120° with respect to arms 114 and 116, a phase B voltage is generated that lags phase A voltage by 120°. Similarly, excitation winding 102c is displaced by 120° with respect to 102b and salient arms 114, 116 are similarly displaced with respect to salient arms 118 and 112. This produces phase C voltage 142 that lags phase B voltage by 120°. Thus, a 3-phase power is generated in AC armature coils 106a, 106b and 106c.

Figure 8:
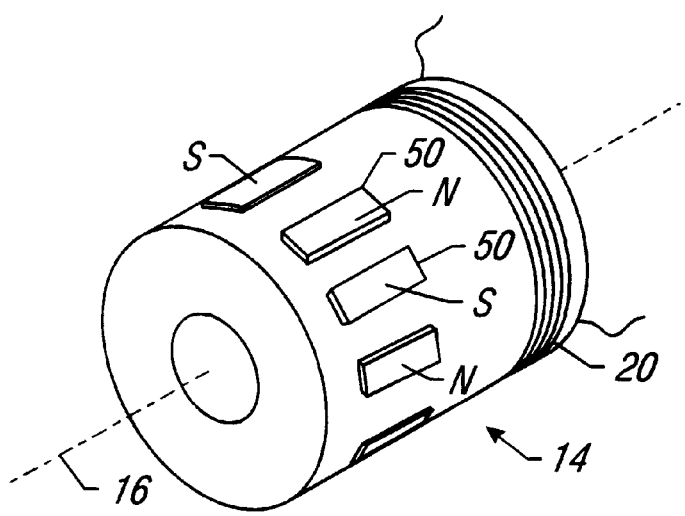
FIG. 8 is an isometric view of the stator assembly of an alternator embodiment of the invention.

Other embodiments are within the scope of the claims. For example, field excitation windings 18 in the embodiment described above in conjunction with FIG. 1 were double pancake coils. Referring to FIG. 8, in an alternative embodiment, the excitation windings are replaced with permanent magnets 50. As was the case with the embodiment of FIG. 1, adjacent magnets 50 have a polarity of opposite view.

Also excitation windings 18 and armature windings 20 in the embodiment described above in conjunction with FIGS. 1 and 2, were both formed of high temperature superconducting material. Thus, cryocooling both types of windings was required. In other applications, however, only the excitation windings 18 may be formed of superconducting material with the armature winding formed of conventional non-superconducting material (e.g., copper). In this case, only excitation windings would require cryocooling. Similarly, excitation windings 18 can be formed of copper with armature winding formed of HTS material and cryocooled.

The foregoing descriptions of embodiments of the invention have been presented for purposes of illustration and description. They are not intended to be exhaustive or to limit the invention to the precise form disclosed. The particular chosen embodiments are described in order to best explain the principles of the invention.

What is claimed is:

1. A rotating machine comprising:
   a static support member;
   a direct current field excitation winding mounted on the static support member;
   an alternating current armature winding magnetically coupled to the excitation winding and mounted on the static support member, at least one of the excitation winding and armature including a superconducting material;
   a core member having a longitudinal axis and disposed adjacent to the excitation winding and armature winding, the core member being formed of a magnetic permeable material and rotatable about the longitudinal axis and around the static support member; and
   a refrigerator unit which cryogenically cools the at least one of the excitation winding and armature including the superconducting material.

2. The rotating machine of claim 1 wherein the field excitation source is a permanent magnet.

3. The rotating machine of claim 1 wherein the field excitation source is a coil.

4. The rotating machine of claim 3 wherein the superconducting material is a high temperature superconductor.

5. The rotating machine of claim 4 wherein the high temperature superconductor is in the form of a tape having a thickness and a width greater than the thickness.

6. The rotating machine of claim 5 wherein the field excitation source is a pancake coil.

7. The rotating machine of claim 6 wherein the pancake coil is a double pancake.

8. The rotating machine of claim 7 wherein the double pancake coil is a saddle-shaped racetrack coil.

9. The rotating machine of claim 5 wherein the field excitation source is a layer wound coil.

10. The rotating machine of claim 5 further comprising a plurality of field excitation sources, circumferentially spaced from each other and mounted on the static support member.

11. The rotating machine of claim 10 wherein adjacent ones of the plurality of field excitation sources have polarities of opposite sense.

12. The rotating machine of claim 5 wherein the core member includes a plurality of salient members extending in a direction substantially parallel to the longitudinal axis.

13. The rotating machine of claim 12 wherein the plurality of salient members include a first group of salient members spaced from the longitudinal axis by a first radial distance and a second group of salient members spaced from the longitudinal axis by a second radial distance greater than the first radial distance.

14. The rotating machine of claim 13 wherein the core member is in the form of a circumferentially-stacked lamination of the magnetic permeable material.

15. A polyphase rotating machine comprising:

a static support member;

a plurality of direct current field excitation source groups, each mounted on the static support member and having at least a pair of field excitation sources, each field excitation source from a first one of the field excitation source groups being radially spaced from a field excitation source of a second one of the field excitation source groups, each field excitation source including a superconducting material;

a plurality of alternating current armature windings mounted on the static support member, each winding associated with and magnetically coupled to a corresponding one of the plurality of phase winding groups;

a core member having a longitudinal axis, the core member disposed adjacent to the field excitation sources and armature windings, the core member being formed of a magnetic permeable material and rotatable about the longitudinal axis and around the static support member; and a refrigerator unit which cryogenically cools at least one of the excitation source groups and armature windings.

16. The polyphase rotating machine of claim 15 wherein the field excitation sources are permanent magnets.

17. The polyphase rotating machine of claim 15 wherein the field excitation sources are coils.

18. The polyphase rotating machine of claim 17 wherein the superconducting material is a high temperature superconductor in the form of a tape having a thickness and a width greater than the thickness.

19. The polyphase rotating machine of claim 18 wherein the core member includes a plurality of salient member groups, each group extending in a direction substantially parallel to the longitudinal axis and radially spaced from another of the groups of salient members, each of the phase winding groups positioned between the groups of salient members.

20. The polyphase rotating machine of claim 18 wherein the pancake coils are double pancake coils.

21. The polyphase rotating machine of claim 18 wherein each of the excitation sources are pancake coils.

22. The polyphase rotating machine of claim 17 wherein the coils are double pancake coils in the form of saddle-shaped racetrack coils.

23. The polyphase rotating machine of claim 17 wherein each of the field excitation source groups include a plurality of field excitation sources, circumferentially spaced from each other and mounted on the static support member.

24. The polyphase rotating machine of claim 23 wherein adjacent ones of the plurality of field excitation sources are wound in opposite directions.

25. The polyphase rotating machine of claim 15 is three-phase rotating machine.

* * * * *